(12) United States Patent
Kopish (10) Patent No.: US 6,167,579 B1
(45) Date of Patent: Jan. 2, 2001

(54) FURNITURE SYSTEM (75) Inventor: Andrew J. Kopish, Green Bay, WI (US)

(73) Assignee: Krueger International, Inc., Green Bay, WI (US)

( * ) Notice: Under 35 U.S.C. 154(b), the term of this patent shall be extended for 0 days.

(21) Appl. No.: 08/472,536

(22) Filed: Jun. 7, 1995

(51) Int. Cl.⁷ .............................. A47C 19/22; F16B 5/07; F16B 7/22
(52) U.S. Cl. .................................. 5/2.1; 5/200.1; 5/400; 108/107; 248/243; 403/253; 403/298
(58) Field of Search .......................... 5/2.1, 8, 9.1, 186.1, 5/400, 465, 659, 660, 200.1, 201, 203, 207, 236.1, 238; 248/24.3, 220.43; 108/107, 108, 153, 157, 180, 181, 185; 52/36.1, 36.2, 36.4, 36.5, 36.6, 239; 403/292, 298, 252, 254, 253, 247; 211/187, 182, 190, 188, 194

(56) References Cited

U.S. PATENT DOCUMENTS

| D. 194,674 |   | 2/1963  | Radinsky . |          |
|------------|---|---------|------------|----------|
| D. 205,498 |   | 8/1966  | Pink .     |          |
| D. 211,476 |   | 6/1968  | Fasanella .|          |
| D. 211,852 |   | 8/1968  | La Rocca et al. .|    |
| D. 227,722 |   | 7/1973  | Mendlin .  |          |
| D. 227,725 |   | 7/1973  | Mendlin .  |          |
| D. 238,131 |   | 12/1975 | Mendlin .  |          |
| D. 252,542 |   | 8/1979  | Lewis .    |          |
| D. 276,386 |   | 11/1984 | Shaw .     |          |
| D. 277,433 |   | 2/1985  | Hull .     |          |
| D. 279,339 |   | 6/1985  | Testa .    |          |
| D. 281,474 |   | 11/1985 | Moorkens . |          |
| 2,057,334  | * | 10/1936 | Hannum ................................ 108/157 |
| 3,040,905  |   | 6/1962  | Gingher et al. . |   |
| 3,297,374  |   | 1/1967  | Radek .    |          |
| 3,316,564  |   | 5/1967  | Rogers, Jr. . |        |
| 3,338,648  |   | 8/1967  | Bannister . |         |
| 3,389,410  |   | 6/1968  | Weigel .   |          |
| 3,475,769  |   | 11/1969 | Fasanella .|          |
| 3,601,432  | * | 8/1971  | Fenwick ................................ 211/182 |
| 3,900,905  |   | 8/1975  | Johnson et al. . |    |
| 3,952,342  |   | 4/1976  | Hart .     |          |
| 3,972,638  | * | 8/1976  | Vivroli ................................ 403/298 |
| 4,016,610  |   | 4/1977  | Ordonez .  |          |
| 4,027,453  | * | 6/1977  | Bridge ................................ 403/253 |
| 4,064,996  | * | 12/1977 | Shillom ................................ 108/107 |

(List continued on next page.)

FOREIGN PATENT DOCUMENTS

153699 * 11/1920 (GB) ........................................ 5/308

OTHER PUBLICATIONS

Living Systems Brochure and Specifications, undated.

* cited by examiner

Primary Examiner—Terry Lee Melius
Assistant Examiner—Robert G. Santos
(74) Attorney, Agent, or Firm—Andrus, Sceales, Starke & Sawall, LLP (57) ABSTRACT

A furniture system includes a bed section and a work and storage section, each of which includes spaced end frame assemblies defined by corner posts and cross-members. The corner posts of each section can be stacked using a connector member to provide a loft bed configuration, and various storage or work components, such as a desk, are connectable to the posts below the bed. The posts include inwardly and outwardly facing recesses, and spaced vertical slots are formed in one of the recess walls. The bed includes rails having end tabs engageable within selected slots for adjustably securing the bed rails to and between the posts. The storage components and the desk also include bracket structure having tabs engageable within the post slots for adjustably mounting such components to the posts.

16 Claims, 7 Drawing Sheets

U.S. PATENT DOCUMENTS

| | | |
|---|---|---|
| 4,070,715 | 1/1978 | Reppas . |
| 4,109,328 | 8/1978 | Mason . |
| 4,119,177 | 10/1978 | Andersson . |
| 4,139,077 | 2/1979 | Pena, Jr. . |
| 4,186,666 | 2/1980 | Honickman . |
| 4,232,411 | 11/1980 | Speyer . |
| 4,237,563 | 12/1980 | Ollerman . |
| 4,253,204 | 3/1981 | Tasaka . |
| 4,312,086 | 1/1982 | Bianco . |
| 4,483,027 | 11/1984 | Cowell et al. . |
| 4,607,576 * | 8/1986 | Kranjec ................................. 108/107 |
| 4,617,689 * | 10/1986 | Nelson et al. ............................ 5/400 |
| 4,694,518 | 9/1987 | Luekich et al. . |
| 4,745,644 * | 5/1988 | Pottschmidt .......................... 5/200.1 |
| 4,826,115 * | 5/1989 | Novitski ............................... 248/243 |
| 4,999,864 | 3/1991 | Crews . |
| 5,003,650 | 4/1991 | Caya . |
| 5,111,540 | 5/1992 | Caya . |
| 5,144,780 * | 9/1992 | Gieling et al. ....................... 403/292 |
| 5,233,707 | 8/1993 | Perkins . |
| 5,263,210 | 11/1993 | Pollard . |
| 5,469,589 * | 11/1995 | Steed et al. ............................. 5/400 |

FURNITURE SYSTEM

BACKGROUND AND SUMMARY OF THE INVENTION

This invention relates to furniture, and more particularly to a furniture system adapted for use in a residence hall or other institutional setting.

In the past, furniture used in residence halls or other similar institutional settings has consisted of a floor-mounted bed unit, a desk area with associated drawers, a storage unit adjacent to or over the desk area, and a closet area and dresser for clothing storage. An additional storage unit may be located to adjacent the bed, and the bed may be mounted on rollers for movement toward and away from the wall to which the storage unit is mounted. Installations such as this are relatively inflexible, in that all components except the bed unit and the dresser are fixed in position, being mounted to the walls and/or floor of the room. While this type of arrangement is functional and generally satisfactory, it has come to be recognized that room residents often exercise great creativity in an effort to gain more floor space, such as by elevating the bed using various devices and by rearranging, to the extent possible, the remaining furniture components. Further, arrangements such as this are inadequate to change the room construction according to different uses and users, e.g. when the room is being used by a different number of persons then that for which it was designed, or when a different character of user, e.g. an elderly person, is using the room.

In view of the above, there exists a need for a flexible furniture system for use in residence halls or other similar settings, in which the furniture components can be easily moved, repositioned or reconfigured according to the requirements of the user or according to the use of the room. There further exists a need for such a system in which the furniture components can be easily moved, repositioned or reconfigured without the use of tools and involving little change to the basic structure of the system. A need also exists for such a system which is relatively simple in its construction, components and operation.

In accordance with the invention, a furniture system incorporates a number of aspects which accomplish the above objectives.

In accordance with one aspect of the invention, a furniture system includes a series of posts, with each post having a substantially vertical longitudinal recess defined by two or more recess walls. A series of vertically spaced slots are formed in at least one of the recess walls, and a plurality of furniture components are removably mountable to the posts by means of bracket structure associated with each component. The bracket structure defines one or more tabs which are removably engageable within the slots, and the recess functions to conceal the slots and at least a portion of the bracket structure. The recess is preferably defined by an inner, outwardly facing recess wall with a pair of recess sidewalls extending between the inner recess wall and the external walls of the post, and the slots are preferably formed in the inner recess wall.

In accordance with another aspect of the invention, a post construction for a furniture system consists of interchangeable upper and lower sections. The upper post section has a lower end defining a downwardly facing recess; and the lower post section has an upper end defining an upwardly facing recess. A connector secures the upper and lower post sections together. The connector includes a first, upwardly extending mounting portion extending into the downwardly facing recess of the upper post section and a second, downwardly extending mounting portion extending into the upwardly facing recess of the lower post section. A rim section is interposed between the first and second mounting portions, and the rim section is exposed between and engageable by the lower end of the upper post section and the upper end of the lower post section. The rim section preferably defines an outwardly facing surface exposed between the upper and lower post sections, and has a cross-section corresponding to the post sections. The first and second mounting portions of the connector each include a recessed area within which the recesses formed in the post sections are disposed.

In accordance with a further aspect of the invention, a furniture system includes a pair of spaced supports, each support having a series of spaced vertical slots. A storage-type furniture component includes at least a pair of end walls, and a back wall, and the back wall includes opposite end portions. Each end portion of the back wall includes a series of tabs which are selectively engageable with the spaced vertical slots in the supports for removably mounting the furniture component to and between the supports. Each back wall end portion extends outwardly from one of the end walls, and an intermediate section is interposed between the tabs and the adjacent end wall. The tabs are preferably formed on the endmost extent of the back wall end portions, which is bent relative to the intermediate section so as to enable the furniture component to be mounted to the spaced supports by exerting a push-on force in a direction parallel to the orientation of the tabs toward the supports.

In accordance with yet another aspect of the invention, a bed construction includes a pair of side rails and support structure for spacing the side rails above a supporting surface. A series of cross-members extend between the side rails, and a bottom wall is disposed between the side rails and supported by the cross-members for supporting a mattress thereabove. The bottom wall is defined by two or more panels, with each panel having transverse edges arranged such that the facing edges of adjacent panels define a joint between the panels. Each joint is located over one of the cross-members so that, when the bed construction is viewed from below, the joints are concealed by the cross-members. The cross-members are preferably U-shaped in cross-section, with each defining a pair of spaced, substantially vertical legs. The joints between adjacent panels are disposed between the legs of the U-shaped cross-members. Two of the cross-members are located toward the ends of the bed construction to support the ends of the bottom wall defined by edges of the endmost panels. The end cross-members are preferably formed so as to provide an upward extension on the outer leg of the U-shaped cross-member, and an inwardly extending lip extending from the upper end of the upper extension to receive the end of the panel.

In accordance with yet another aspect of the invention, the cross-members of the bed construction are connected to the rails via connection structure which includes a downwardly extending locking tab formed at each end of the cross-member, and an upwardly facing recess associated with each rail for receiving the locking tab therewithin to removably secure each cross-member to the rail. Each rail preferably is in the form of an assembly consisting of an inner rail member and an outer rail member. The inner rail member is further preferably a metal member having tab structure at its opposite ends for removably securing each rail assembly between spaced posts. The outer rail member is preferably in the form of a wooden board secured to the inner rail member and defining spaced ends which are in close proximity to or which engage the spaced posts. Alternatively, the outer rail member may be formed of any other satisfactory material, such as steel. The upwardly facing recess associated with each rail is preferably constructed by a strip of material having end portions secured to the inner rail member and an inwardly extending central portion located between the end portions and spaced from the inner surface of the inner rail member to define the upwardly facing recess. The cross-members are constructed so as to define end portions which engage the inner rail member when the locking tab is received within the recess so as to securely mount the cross-members between the rails and to reinforce the bed construction.

In accordance with a still further aspect of the invention, a furniture system consists of a bed section defined by a first series of posts, support structure extending between and interconnected with the posts, and a mattress disposed above and supported by the support structure. A furniture-mounting section is defined by a second series of posts and includes a plurality of furniture components mounted to the posts. The bed section is removably mountable to the furniture-mounting section by removable engagement of the lower ends of the first series of posts with the upper ends of the second series of posts, preferably via connectors as summarized above. The furniture components and the bed support structure is preferably interconnected with the posts by connection structure providing removable and adjustable engagement of the furniture components and the bed support structure with the posts, such as via the recessed slot and tab structure summarized above. With this arrangement, the components of the bed and the furniture components can be adjusted according to the desires of the user, and in addition the bed section and the furniture-mounting section can be separated from each other if desired.

The invention further contemplates a method of arranging furniture, substantially in accordance with the immediately preceding summary.

The various aspects of the invention as summarized above are preferably incorporated into a single system which provides highly advantageous construction and operation of the furniture system. However, it is to be appreciated that the various aspects can be used individually or in various subcombinations, as desired, again according to the requirements of the end user or according to manufacturing or marketing requirements or constraints.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figures 1, 14:
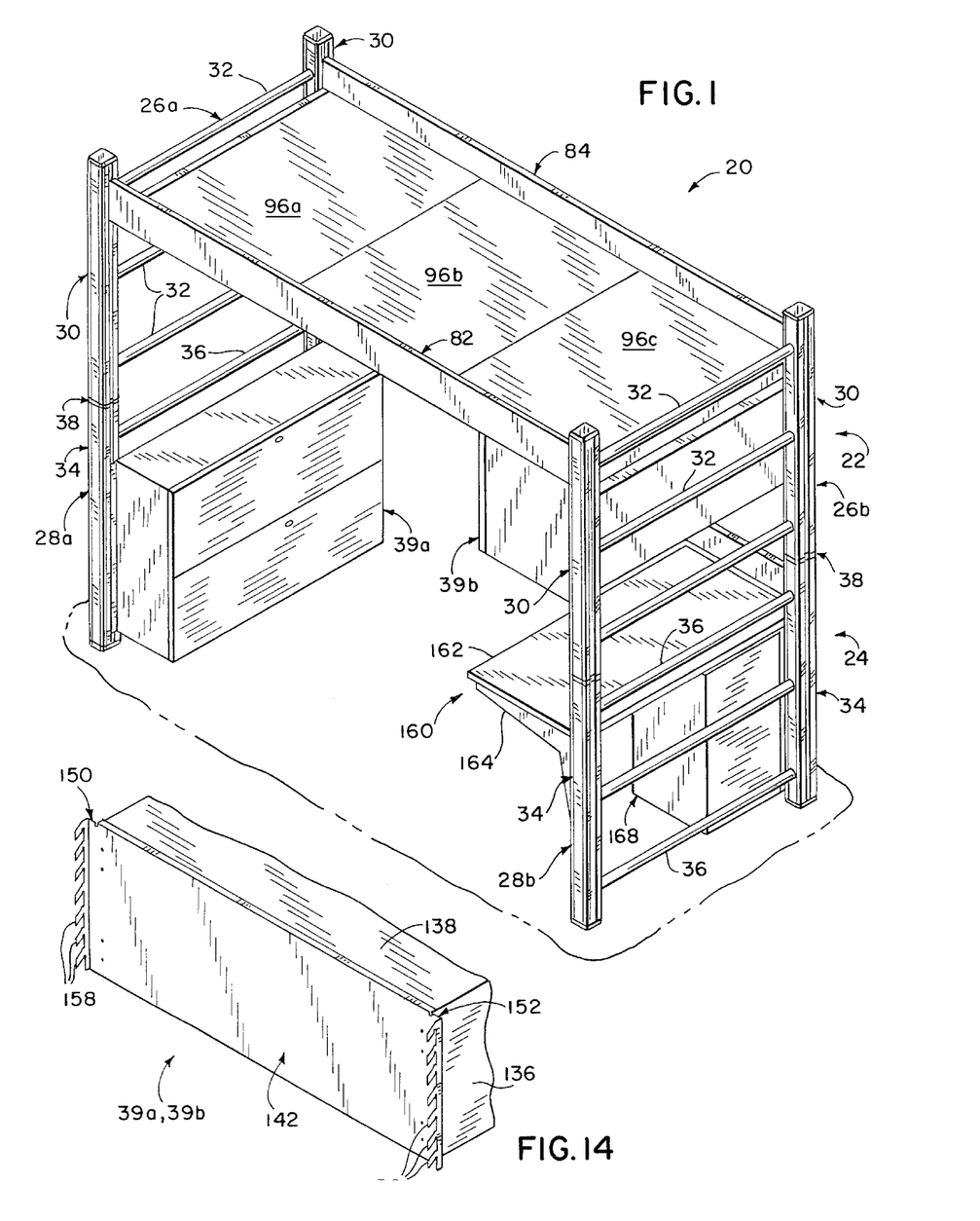
FIG. 1 is an isometric view of a furniture system constructed according to the invention.
FIG. 14 is a partial isometric view showing the back blank of FIG. 13 as mounted to a furniture component.

FIG. 1 illustrates a furniture system 20 which is particularly well-suited for use in an environment such as a dormitory, residence hall, or the like. Generally, furniture system 20 consists of a bed section 22 and a furniture-mounting storage and work section 24, to which a series of furniture components are mounted. Bed section 22 includes a pair of identical ladder-type end frame assemblies 26a, 26b, and storage/work section 24 similarly includes a pair of substantially identically constructed lower frame assemblies 28a, 28b. Upper frame assemblies 26a, 26b each include spaced, vertical posts 30 with horizontal cross-members 32 extending between and through the facing walls of the posts 30, which are internally welded to the walls of posts 30. Similarly, lower frame assemblies 28a, 28b each include a pair of spaced posts 34 with cross-members 36 extending between and through the facing walls of posts 34 and internally welded to the walls of posts 34. As shown in FIG. 1, bed section 22 can be mounted to storage/work section 24 by positioning a connector 38 between the lower end of each post 30 and the upper end of each post 34 which secures posts 30, 34 together, in a manner to be explained.

A series of storage-type furniture components, shown in FIG. 1 at 39a and 39b are removably and adjustably mounted to frame assemblies 38, 30, again in a manner to be explained.

Figure 2:
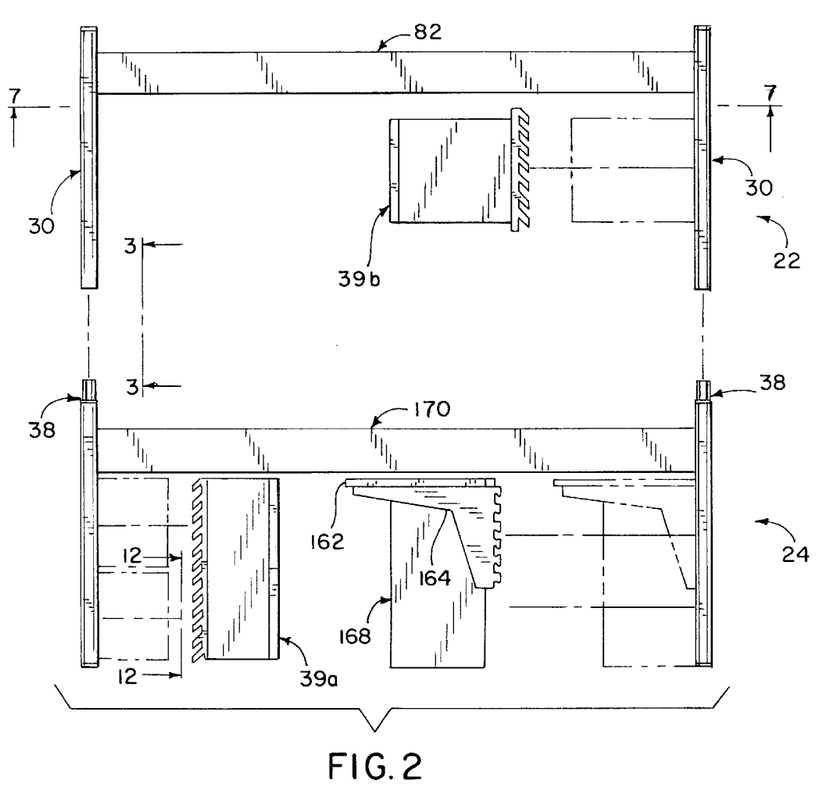
FIG. 2 is an exploded front elevation view of the furniture system of FIG. 1.

Referring to FIG. 2, bed section 22 can be removed from storage/work section 24 by disengaging posts 30 from connectors 38. In this manner, bed section 22 can be mounted on the floor or other supporting surface at any desired location.

FIGS. 3–6 illustrate the construction of posts 30, 34 and connector 38. Posts 30 and 34 are substantially identical, with each being constructed of an inner post section 40 and an outer post section 41. Post section 40 includes an inner wall 42 and a pair of side walls 43 having recesses 44 formed by recess side walls 45, 46 and an outwardly facing recess wall 47. Side walls 43 terminate in end sections 48. A series of vertically spaced slots 49 are formed in outwardly facing recess walls 47.

Figures 3, 4, 5A, 5B, 5C, 6:
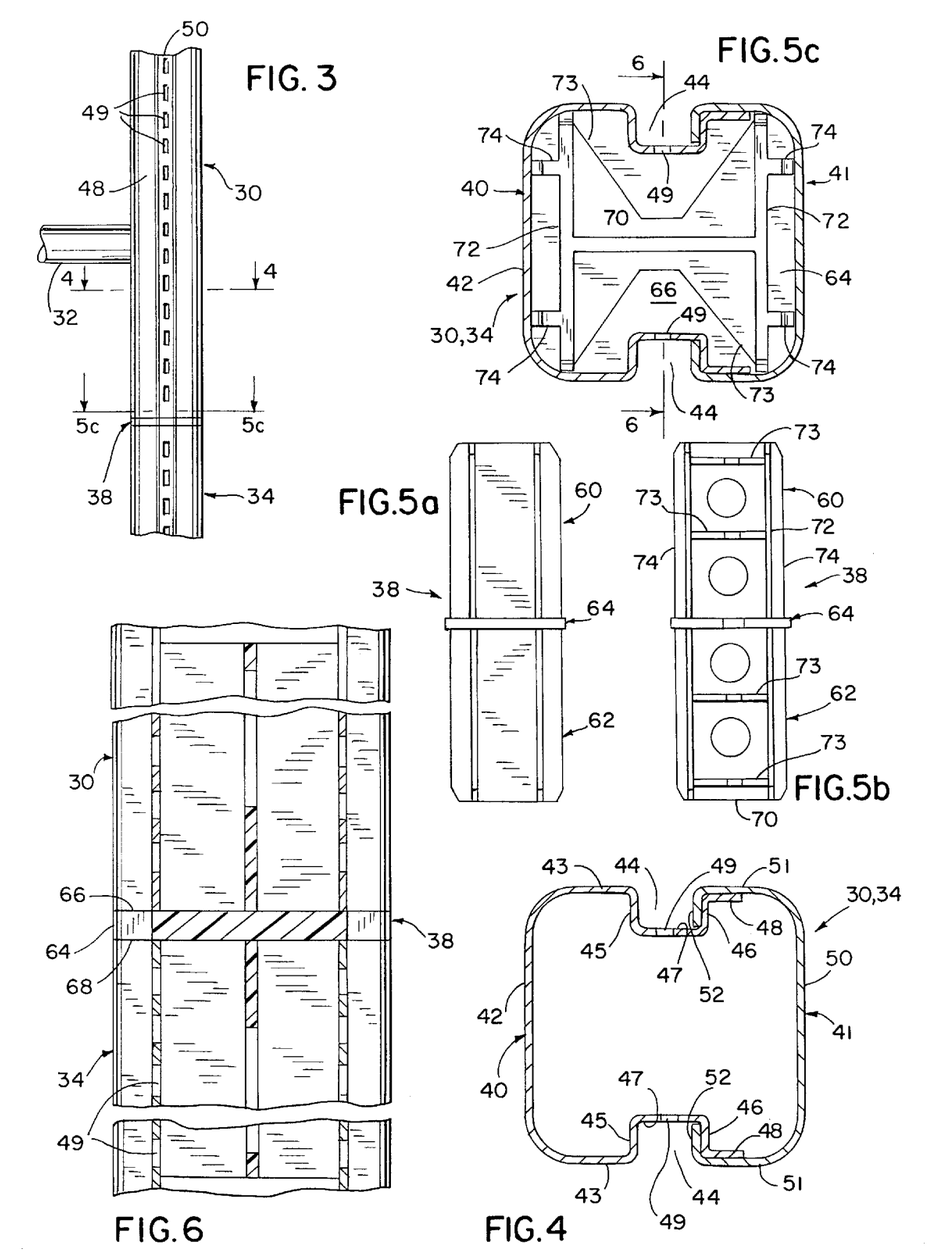
FIG. 3 is a partial side elevation view showing connection of an upper post section to a lower post section for the furniture system of FIG. 1, reference being made to line 3—3 of FIG. 2.
FIG. 4 is a section view taken along line 4—4 of FIG. 3, showing the cross-sectional construction of the post.
FIGS. 5a and 5b are front and side elevation views, respectively, showing a connector for securing the upper and lower post sections together.
FIG. 5c is a section view taken along line 5c—5c of FIG. 3.
FIG. 6 is a partial section view taken along line 6—6 of FIG. 5c.

Outer post section 41 includes an outer wall 50 and a pair of side walls 51. Inwardly extending end sections 52 are formed at the ends of side walls 51.

Posts 30, 34 are formed by positioning end sections 52 of outer post section 41 into recess 44 such that end sections 52 overlap, and are located adjacent, recess side walls 46, as shown in FIG. 4. With post sections 40 and 41 in this position, end sections 48 of inner post section 40 are located adjacent the inner surfaces of outer post section side walls 51. End walls 52 and recess side walls 56 are then welded together using conventional resistance welding technology, as are end sections 48 and side walls 51, to connect post sections 40 and 41 together. Each post thus includes oppositely-facing recesses 44 having a line of spaced, vertical slots 49, with recesses 44 being formed in oppositely facing post end walls defined by side walls 43 and 51. Post section walls 42 and 50 extend between and interconnect the post end walls. With this construction, posts 30 and 34 define a hollow interior.

As shown in FIGS. 5a–5c, each connector 38 includes an upper mounting section 60, a lower mounting section 62, and a central rim section 64 disposed between upper and lower mounting sections 60, 62. Rim section 64 defines an outer peripheral surface which substantially corresponds to the cross-section of each of posts 30, 34, i.e. the outer surface of rim section 64 follows the contour of the outer surfaces of posts 30, 34 throughout their entire outer periphery. Rim section 64 further defines an upwardly facing abutment surface 66 engaged by the lower end of post 30, and a downwardly facing abutment surface 68 engaged by the upper end of post 34.

Upper and lower mounting sections 60 and 62 are identical in construction. As shown in FIG. 5c, each mounting section is generally H-shaped, being defined by a central web section 70 and a pair of parallel flange sections 72. Gussets 73 extend between flange sections 72 and web section 70 to stiffen flanges 72. Circular openings are formed in web 70 between gussets 73. A series of engagement bosses 74 extend outwardly from the outer surface of each flange section 72. The extremities of the ends of flange sections 72 and mounting bosses 74 are beveled. The circular recesses formed in web section 70 provide flexibility of mounting sections 60 and 62 relative to rim section 64.

As shown in FIG. 5c, flange sections 72 and mounting bosses 74 are formed so as to engage the inner surfaces of posts 30, 34, with one end of each flange section 72 and one of mounting bosses 74 being arranged so as to straddle each corner of the post. This engagement of mounting sections 60 and 62 with posts 30, 34, respectively, provides an interference fit between connector 38 and each post section, so as to secure post sections 30, 34 together.

Lower mounting section 62 is engaged within the hollow interior of lower post 34 by application of a downward push-on force, resulting in engagement of the upper end of lower post 34 with downwardly facing abutment surface 68 of rim section 64. Similarly, upper post section 30 is engaged with upper mounting section 60 of connector 38 by application of a downward push-on force until engagement of the lower end of upper post 30 with upwardly facing abutment surface 66 of rim section 64. Connector 38 is removed by reversing these steps.

As noted previously, the openings in central web section 70 accommodate a small amount of flexure of upper and lower mounting sections 60 and 62. This accommodates for intolerances between upper and lower post sections 30 and 34, and provides for toolless connection and removal of connector 38.

As can be appreciated, bed section 22 can be removed from storage/work section 24 by exerting an upward force on post sections 30 to remove post sections 30 from connectors 38. Connectors 38 are then removed from post sections 34, and end caps are then preferably mounted to the upper ends of posts 34 and the lower ends of post 30 to enclose the hollow interiors of the post sections.

Figure 7:
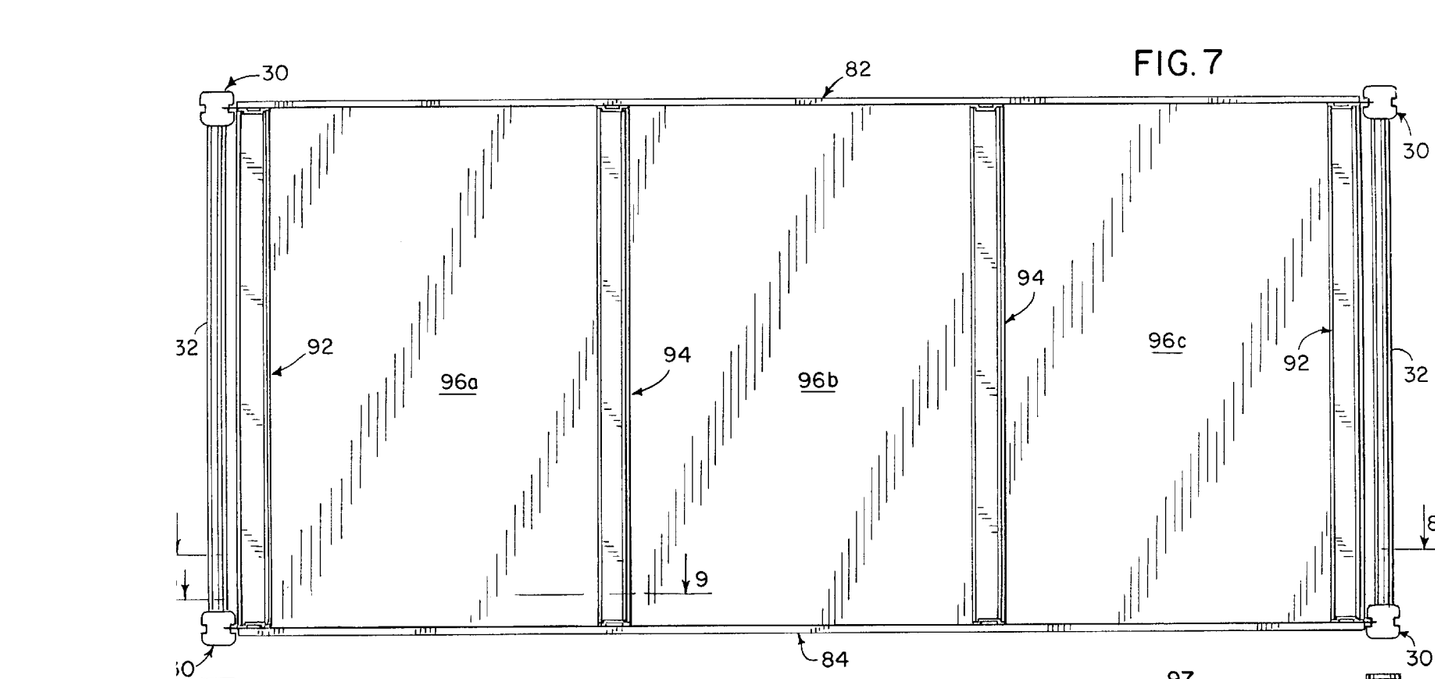
FIG. 7 is a bottom plan view of the bed section for the furniture system of FIG. 1.
Figure 8:
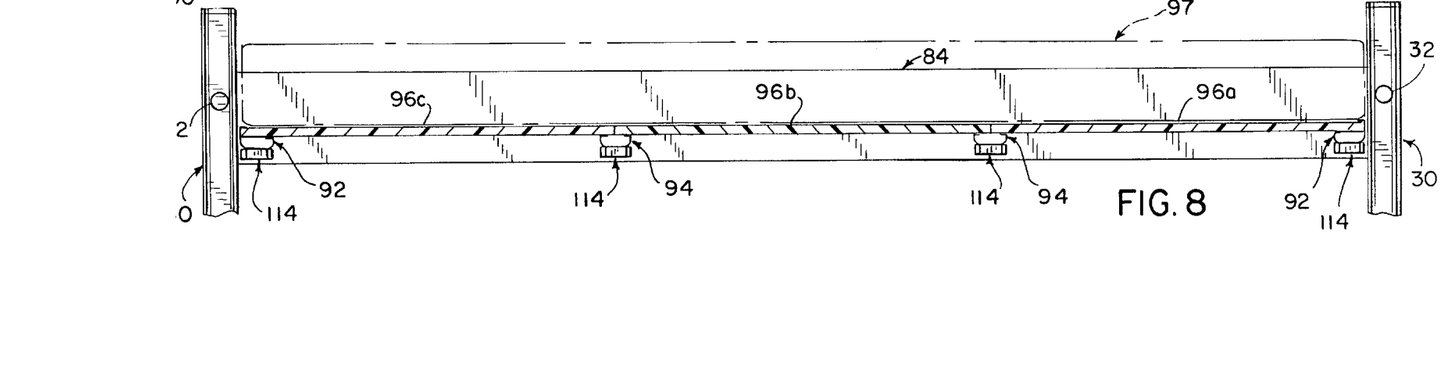
FIG. 8 is a partial section view taken along line 8—8 of FIG. 7.
Figures 11, 12:
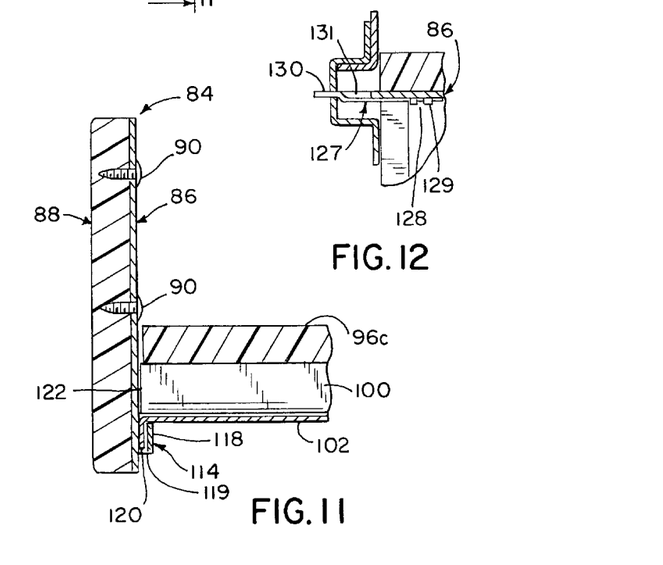
FIG. 11 is a partial section view taken along line 11—11 of FIG. 9.
FIG. 12 is a partial section view taken along line 12—12 of FIG. 9.

Referring to FIGS. 7 and 8, bed section 22 includes a pair of side rail assemblies 82, 84 extending between posts 30. As shown in FIG. 11, each rail assembly, such as 84, consists of an inner plate member 86 and an outer member 88, such as in the form of a wood board or steel member to which plate 86 is connected via screws 90. A pair of end stringers 92 and a pair of intermediate stringers 94 extend between rail assemblies 82, 84. End stringers 92 are connected toward the opposite ends of rail assemblies 82, 84, and intermediate stringers 94 are evenly spaced between end stringers 92.

A sectioned bottom wall, consisting of panels 96a, 96b and 96c, is disposed above stringers 92 and 94. Each of panels 96a–96c defines end edges located adjacent the inner surface of one of rail assemblies 82, 84. Panels 96a–96c further define side edges, with one edge of each of panels 96a and 96c defining the opposite side edges of the bottom wall, and the opposite edges of panels 96a and 96c forming joints between the adjacent side edges of panel 96b. Intermediate stringers 94 and the joints between panels 96a, 96b and 96b, 96c are arranged such that each joint is located over one of stringers 94. In this manner, when bed section 22 is viewed from below as shown in FIG. 7, the joints between adjacent panels 96a–96c are concealed by stringers 94.

As shown in FIG. 8, stringers 92, 94 and panels 96a–96c support a mattress 97 (shown in phantom) thereabove between side rail assemblies 82, 84.

Figure 9:
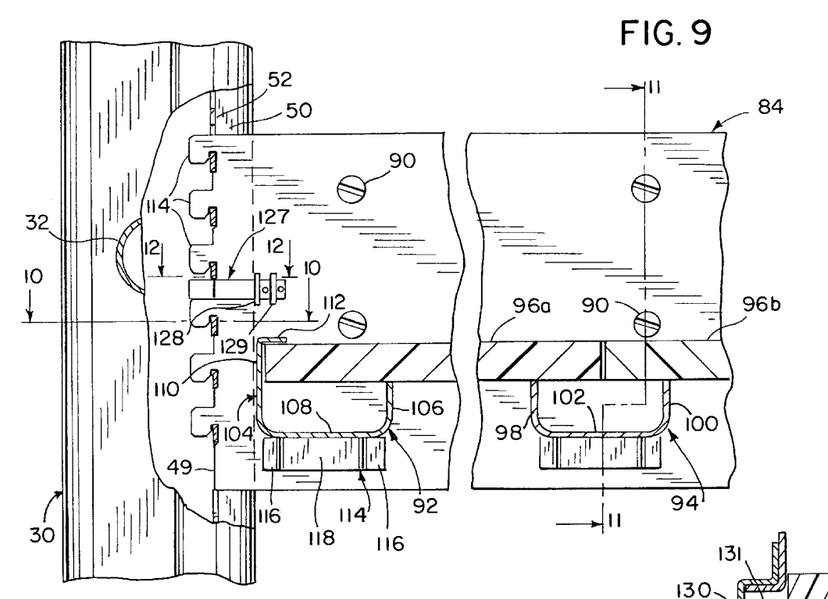
FIG. 9 is an enlarged partial section view taken along line 9—9 of FIG. 7.

Referring to FIGS. 8 and 9, intermediate stringers 94 are generally U-shaped in cross-section, with each defining a pair of spaced, vertical side legs 98, 100 and a lower, horizontal base section 102 extending between and interconnecting the lower ends of side legs 98, 100. The upper ends of side legs 98, 100 have inwardly extending lips which engage the lower surfaces of panels 96a, 96b and 96c, 96d on opposite sides of the joint defined by the adjacent panel side edges, to conceal the joint and to support panels 96a–96c thereabove. End stringers 92 are similarly constructed, being defined by spaced, vertical side legs 104, 106 and a lower, horizontal base section 108 extending between and interconnecting the lower ends of side legs 104, 106. Side leg 104 is constructed differently than the side legs of intermediate stringers 94, and includes an upper extension 110 which extends from the bottom surface to the top surface of the panel, such as 96a, 96c, and a horizontal lip 112 extending inwardly from the upper end of extension 110 toward side leg 106. Lip 112 extends past the side edge of the panel, such as 96a, 96c, and engages the panel top surface so as to conceal the panel side edge. Panels 96a–96c are sized such that, when assembled together as shown in FIGS. 7 and 8, the joints between adjacent panels define a very narrow gap and such that little relative movement between adjacent panels is tolerated by engagement of extension 110 of end stringers 92 with the panel side edges.

FIGS. 9 and 11 illustrate the connection of stringers 92, 94 to rail assemblies 82, 84. As noted previously, each of rail assemblies 82, 84 is a composite consisting of an inner rail plate member such as 86 and an outer rail member 88 such as a wooden board. Strips 114 are embossed or punched from the inner rail plate members, such as 86, and each strip 114 defines end portions 116 and an inwardly deformed central portion extending between end mounting portions 116. The inwardly deformed central strip portion 118 defines an upwardly and downwardly facing passage 119 between the inner surface of the rail plate member, such as 86, and the facing surface of strip central portion 118.

As shown in FIG. 11, stringers 92, 94 are formed such that, at each end, a downturned locking tab 120 extends from and perpendicularly to the lower base section such as 102, 108. Locking tab 120 extends downwardly into the open upper end defined by passage 119 between strip central portion 118 and the rail plate member such as 86. The upper end of strip central portion 118 engages the lower surface of the stringer lower base section, such as 102, 108. The ends of the stringer side legs, such as shown in FIG. 11 at 122, are substantially coplanar with the outer surface of locking tab 120, and engage the inner surface of each rail plate member, such as 86, when locking tab 120 is engaged within passage 119. This construction functions to maintain rail assemblies 82, 84 at a constant, predetermined distance apart from each other according to the length of each stringer 92, 94, and also provides an assembly arrangement in which stringers 92, 94 can easily be mounted to and removed from rail assemblies 82, 84.

Figure 10:
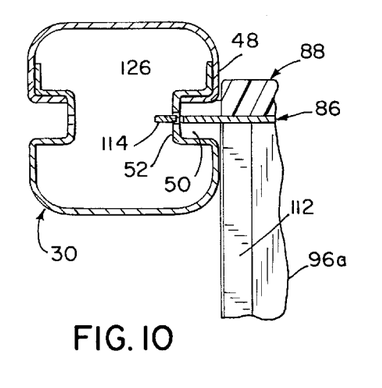
FIG. 10 is a partial section view taken along line 10—10 of FIG. 9.

As shown in FIGS. 9 and 10, each rail plate member, such as 86, includes a series of wedge-type tabs 114 formed on its opposite ends. Tabs 114 are conventional in construction, and are adapted to extend through slots 49 for removably mounting rail assemblies 82, 84 to posts 30. This mounting arrangement provides a simple means for easily adjusting the height of mattress 97.

As shown in FIGS. 9 and 12, a locking bar 127 is slidably mounted to inner rail plate member 86 via a pair of punched strips 128, 129 formed in plate member 86. Strips 128, 129 are located such that locking bar 127 is disposed immediately above the upper end of central tooth 114. Locking bar 127 includes an offset end portion 130, and is movable between a locking position as shown in FIG. 9, in which end portion 130 extends through slot 58 above central tooth 114, and a retracted position in which end portion 130 is moved out of slot 58. A slot 131 is formed in rail plate member 86 to receive end portion 130 when locking bar 127 is in its retracted position. In its locking position of FIG. 9, locking bar 127 prevents upward movement of rail assembly 84 by engaging the upper edge of slot 58 above central tooth 114, while in its retracted position locking bar 127 does not interfere with upward movement of teeth 114. Locking bar 127 and strips 128, 129 are constructed and arranged such that locking bar 127 can be manually moved between its retracted position and its locking position.

As shown in FIG. 9, a pair of spaced openings are formed in the inner end of locking bar 127. The outer opening assists a user in manually moving locking bar 127 between its retracted and locking positions. The inner opening receives a dimple formed in rail plate member 86 between strips 128, 129 to releasably maintain locking bar 127 in its locking position while enabling locking bar 127 to be slid thereover to its retracted position.

A locking bar such as 127 is provided at each end of rail assemblies 82, 84.

The outer rail members, such as 88, are formed such that each end, as shown in FIG. 10 at 126, is located in close proximity to post wall 48 when tabs 114 are received within slots 58 to mount the rail assembly to post 30.

Figure 13:
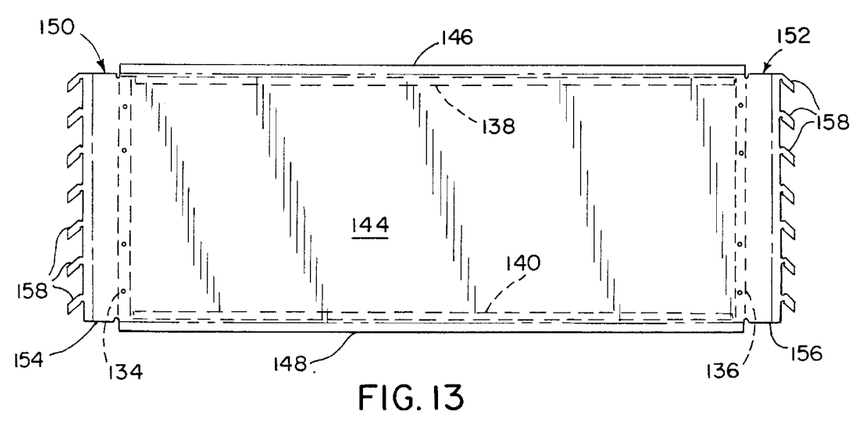
FIG. 13 is an elevation view showing a blank for a furniture component back employed to mount the storage-type furniture components to the furniture system of FIG. 1.

FIGS. 13 and 14 illustrate the mounting construction for the storage-type furniture components, such as shown in FIG. 1 at 39a and 39b, which are mountable to either or both of bed section 22 and/or storage/work section 24. Representatively, components 39a may be a double drawer cabinet, such as for storing clothing or the like. Component 39b may be an overhead flipper door cabinet for storing books or the like. In either case, components 39a, 39b are similarly constructed, with each having spaced end walls 134, 136, a top wall 138 and a bottom wall 140. FIG. 13 shows the layout of walls 134–140 relative to a blank from which a back 142 (FIG. 14) is formed. As shown in FIGS. 13 and 14, back 142 includes a back panel 144 and upper and lower bent lips 146, 148, respectively, which engage upper and lower walls 138, 140, respectively. Back 142 further includes end connector sections 150, 152 which are in the form of extensions of back panel 144 extending outwardly from end walls 134, 136, respectively. Connector sections 150, 152 include intermediate sections 154, 156, respectively, which are coplanar with back panel 144, and perpendicularly bent end sections having conventionally constructed tabs 158 which are engageable within slots 49 to removably and adjustably mount each of components 39a–39b to one of posts 30 or 34. It can thus be appreciated that back 142 provides an efficient construction in which back panel 144 encloses the back of the structure while providing integrally formed mounting brackets for removably and adjustably mounting the component to the posts.

As shown in FIG. 2, a desk 160 is removably and adjustably mounted to posts 34. Desk 160 includes a worksurface 162 and a pair of brackets 164 mounted at the ends of worksurface 162. Brackets 164 include tabs 166 engageable within slots 58 of posts 34 to removably and adjustably mount desk 160 to posts 34. A floor-mounted file cabinet 168 is adapted for placement below worksurface 162.

In addition to or in place of cabinet 39b, a tack board assembly having a back similar to back 142 may be mounted between posts 30.

Furniture assembly 20 is assembled as shown in FIG. 1 by interconnecting posts 30 and 34 of frame assemblies 26 and 28 as shown in FIGS. 3, 5 and 6 using connectors 38. Bed section 22 is then assembled by securing the bed rail assemblies 82, 84 between posts 30 as shown in FIG. 9 by engagement of tabs 114 within the appropriate slots 49, to attain the desired elevation of the bed assembly. A reinforcing rail 170, constructed identically to bed side rail assemblies 82, 84, is interconnected between the rearward posts 34 of storage/work section 24, in order to maintain frame sections 28a, 28b at a predetermined spacing relative to each other. Storage components 39a and 39b are then mounted to frame sections 26 or 28 at any desired elevation using tabs 158 and slots 49. Desk 160 is then mounted to one of frames 28a or 28b, and file cabinet 168 is normally positioned below worksurface 162 or in any other satisfactory location within furniture system 20. It can thus be appreciated that the various components of furniture system 20 can be moved to varying elevations on posts 30 or 34, and can also be moved to the outwardly facing surfaces of posts 30 or 34 to reconfigure furniture system 20. Typically, furniture system 20 will be used in combination with an additional storage component which provides space for hanging of clothing as well as for additional storage, which normally would be positioned toward one end or the other of furniture system 20. In addition, the opposite end of furniture system 20 would normally be exposed so as to provide a ladder-type structure defined by frame cross-members 32 and 36 to enable the user to access mattress 97.

If desired, bed section 22 can be removed from storage/work section 24 as described previously by disengaging posts 30 from connectors 38 and engaging the lower ends of posts 30 with the ground at a location removed from storage/work section 24. This enables furniture system 20 to be reconfigured such that bed section 22 is not lofted. An arrangement such as this would be desirable when a residence hall room is only being used by one person. As noted previously, end caps are preferably secured to the lower ends of posts 30 and the upper ends of posts 34 when connectors 38 are removed so as to enclose the hollow spaces of each.

It can also be appreciated that the components of furniture system 20 can be adjusted to any desired position without the use of any tools, simply by repositioning the tab structure of each component within the desired ones of slots 49 of posts 30 or 34. Further, no tools are required for removing or remounting bed section 22 from or to storage/work section 24. This enables the user to easily adjust and reconfigure furniture system 20 as desired.

Figures 15, 16:
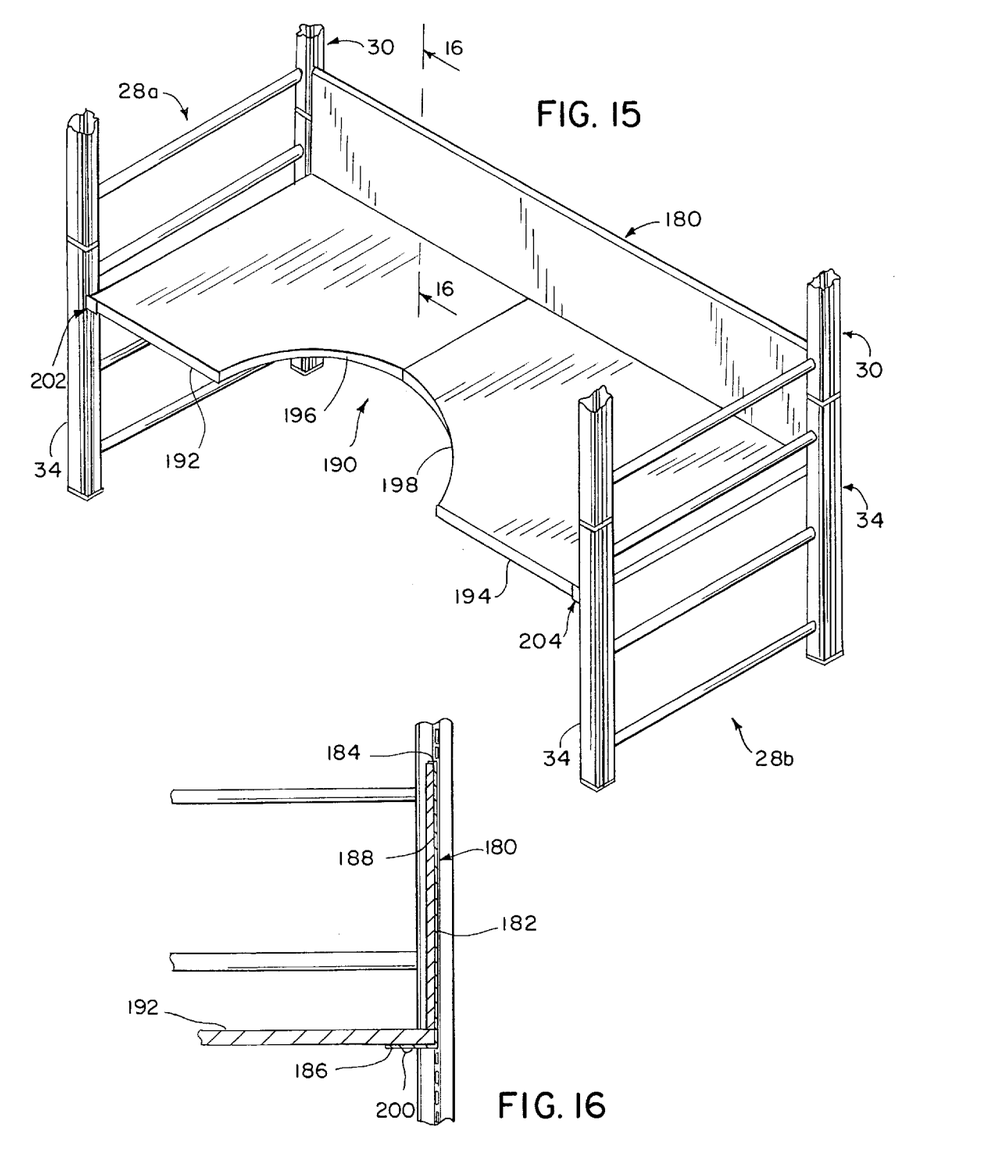
FIG. 15 is a partial isometric view showing an alternative embodiment of a furniture system constructed according to the invention.
FIG. 16 is a partial section view taken along line 15—15 of FIG. 15.

FIGS. 15 and 16 illustrate an alternative arrangement for storage/work section 24. In this arrangement, the storage components such as 39a and 39b are not shown, but are mounted to the outside of either or both of lower frame assemblies 28a, 28b. In this arrangement, reinforcing rail 170 is replaced by a tack board assembly 180 which extends between rear posts 30. Tack board assembly 180 includes a back 182 having an upper lip 184 and a lower flange 186. At its ends, back 182 includes tooth structure similar to teeth 158, which function to securely mount each end of tack board assembly 180 to posts 30, 34. A locking bar such as 127 is provided at the ends of tack board back 182 for maintaining tack board assembly 180 in engagement with the posts, and tack board back 180 includes punched strips within which the locking bar is mounted. A conventional tack board member 188 is mounted to back 182, with its upper end being disposed just below lip 184.

A worksurface assembly, shown generally at 190, extends between frame assemblies 28a, 28b. Worksurface assembly 190 includes mirror-image worksurface halves 192, 194 having arcuate cut-outs 196, 198, respectively, which cooperate to define an indentation or recess for the user. The rear edges of worksurface sections 192, 194 are supported by tack board flange 186, and threaded fasteners such as screws 200 secure worksurface sections 192, 194 to flange 186.

The forward edges of worksurface sections 192, 194 are supported by bracket members 202, 204, respectively. Bracket members 202, 204 include L-shaped sections which engage and support the forward corners of worksurface sections 192, 194, respectively, and further includes tooth structure such as 158 engageable within slots 49 for securing brackets 202, 204 to posts 34, to thereby support worksurface sections 192, 194. Screws such as 200 may be employed to mount bracket members 202, 204 to worksurface sections 202, 204, respectively.

Alternatively, and preferably, worksurface sections 192, 194 are sized so as to provide a force-type fit between tack board back 180 and brackets 202, 204, thus eliminating the need for fasteners 200.

The configuration of FIGS. 15 and 16 is optional, and is capable of providing the user with a substantial amount of work space and tack space, if desired.

In the configuration of FIGS. 15 and 16, tack board assembly 180 functions to provide the lateral stability to furniture system 20 which is provided by reinforcing rail 170 in the embodiment of FIG. 1.

Figures 17, 18:
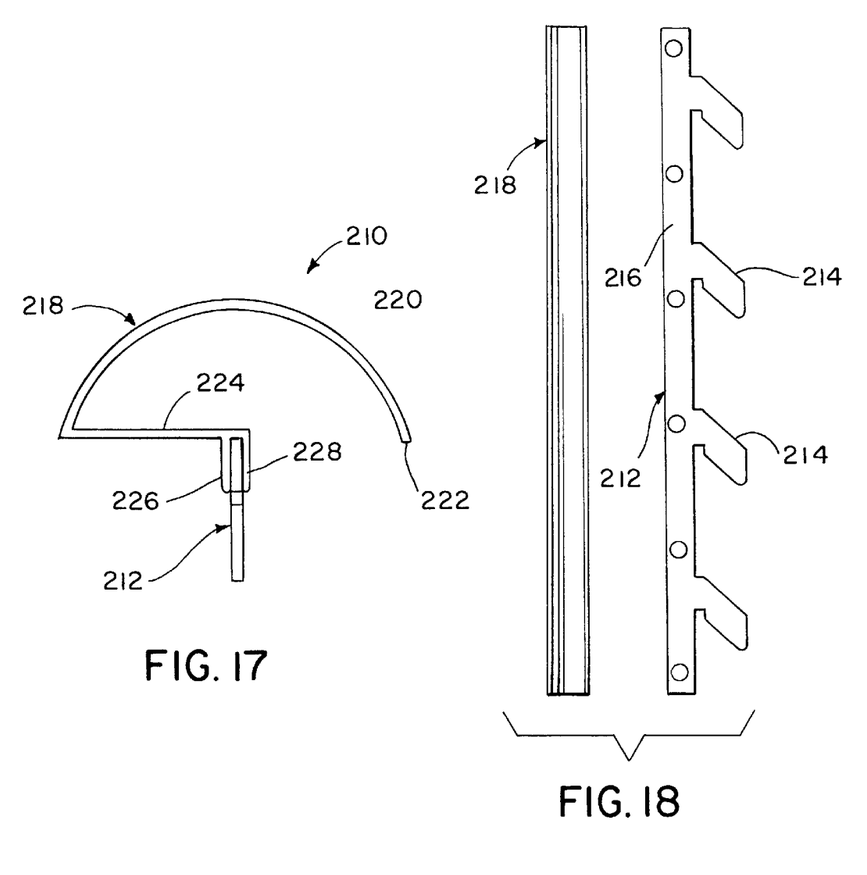
FIG. 17 is a top plan view of a wire management assembly for use in combination with the furniture system of the present invention.
FIG. 18 is a side elevation view of the components of the wire management assembly of FIG. 17.

FIG. 18 illustrates a wire or cable management assembly 210 for use in combination with furniture system 20. Wire management assembly 210 includes a bracket member 212 having teeth 214 constructed identically to teeth 158, and an axially extending mounting section 216 from which teeth 214 extend. Wire management assembly 210 further includes a wire cover 218 having an arcuate wall 220 defining a free end 222, a base 224 extending from the opposite end of cover 220, and a mounting section at the end of base 224 defined by a pair of spaced flanges 226, 228. Wire management assembly 210 is constructed by inserting bracket mounting section 216 into the space between flanges 226, 228, which provides an interference fit between mounting section 216 and flanges 226, 228. Teeth 214 are then engaged within selected slots 49 so as to mount wire management assembly 210 to posts 30 or 34, in any location as desired. When so mounted, the internal space defined by arcuate wall 220 receives cables or wires extending between a power receptacle and an electrical device of any sort, such as a task light, alarm clock or the like. Typically, wire management assembly 210 will be mounted to the rearward post 30 above desk assembly 160 or worksurface assembly 190 so as to conceal wires or cables which otherwise may be visible. The bracket and cover members of wire management assembly 210 may be formed in any length as desired so as to accommodate variations in the length along which it is desired to conceal wires or cables.

Various alternatives and embodiments are contemplated as being within the scope of the following claims particularly pointing out and distinctly claiming the subject matter regarded as the invention.

I claim:

1. A furniture system, comprising:

first and second post assemblies each of which includes a series of posts, each post having a substantially vertical longitudinal recess defined by two or more recess walls;

a series of vertically spaced slots formed in at least one of the recess walls;

wherein each post in the first post assemblies includes a lower end defining a downwardly facing recess and each post in the second post assemblies includes an upper end defining an upwardly facing recess;

a connector for securing the posts together, the connector including a first, upwardly extending mounting portion extending into the downwardly facing recess a second, downwardly extending mounting portion extending into the upwardly facing recess, and a rim section interposed between the first and second mounting portions, wherein the rim section is interposed between and engageable by the lower post end and the upper post end;

a plurality of furniture components removably mountable to the posts in the second post assemblies by means of bracket structure associated with the furniture components, the bracket structure defining one or more tabs removably engageable within the slots;

wherein the plurality of furniture components includes at least one storage-type furniture component including a pair of end walls, and a back wall, wherein the back wall includes end portions defining the one or more tabs, the back wall and tabs being formed integrally;

a rail member extending between and interconnecting the second post assemblies;

a bed engageable with the posts in the first post assemblies, the bed including a pair of side rail members, each of which includes tabs formed at end portions thereof for removably mounting the side rail members to the posts, a plurality of cross-members extending between the side rail members, and a bottom wall disposed between the side rail members and supported by the cross-members, the bottom wall being defined by two or more panels, each panel having transverse edges, wherein facing edges of adjacent panels define joints between the panels and wherein each joint is located over one of the cross-members, and wherein the cross-members are connected to the rails via connection structure including a downwardly extending locking tab formed at each end of the cross-member and an upwardly facing recess associated with each rail for receiving the locking tab to removably secure each cross-member to the rail.

2. A furniture system, comprising:

a series of posts, each post having a substantially vertical longitudinal outwardly facing recess defined by two or more recess walls, wherein each post comprises an upper post section having a lower end defining a downwardly facing internal recess; a lower post section having an upper end defining an upwardly facing internal recess; and a connector for securing the upper and lower post sections together, the connector including a first, upwardly extending mounting portion extending into the downwardly facing recess of the upper post section, a second, downwardly extending mounting portion extending into the upwardly facing recess of the lower post section, and a rim section interposed between the first and second mounting portions, wherein the rim section is interposed between and engageable by the lower end of the upper post section and the upper end of the lower post section and includes an indentation in alignment with the substantially vertical longitudinal outwardly facing recess;

a series of vertically spaced slots formed in at least one of the recess walls; and a plurality of furniture components removably mountable to the posts by means of bracket structure associated with each component, the bracket structure defining one or more tabs removably engageable within the slots.

3. A post construction for a furniture system, comprising:

an upper post section having a lower end defining a downwardly facing internal recess;

a lower post section having an upper end defining an upwardly facing internal recess; and a connector for securing the upper and lower post sections together, the connector including: a first, upwardly extending mounting portion extending into the downwardly facing recess of the upper post section; a second, downwardly extending mounting portion extending into the upwardly facing recess of the lower post section; and a rim section interposed between the first and second mounting portions, wherein the rim section is interposed between and engageable by the lower end of the upper post section and the upper end of the lower post section, wherein the rim section defines an outwardly facing surface corresponding to the cross-section of the lower end of the upper post section and the upper end of the lower post section, wherein the lower end of the upper post section and the upper end of the lower post section each include an outwardly facing longitudinal recess, and wherein the connector includes an indentation in alignment with the outwardly facing longitudinal post section recesses.

4. A post construction for a furniture system, comprising:

an upper post section having a lower end including internal wall structure defining a downwardly facing recess;

a lower post section having an upper end including internal wall structure defining an upwardly facing recess; and a connector for securing the upper and lower post sections together, the connector including: a first upwardly extending mounting portion extending into the downwardly facing recess of the upper post section; a second, downwardly extending mounting portion extending into the upwardly facing recess of the lower post section; and a rim section interposed between the first and second mounting portions, wherein the rim section is interposed between and engageable by the lower end of the upper post section and the upper end of the lower post section, wherein the first and second mounting portions of the connector each include a pair of flanges interconnected by a web and two or more mounting bosses extending outwardly from each flange, wherein end portions of each flange and the mounting bosses engage the internal wall structure of the upper and lower post sections in an interference fit for interconnecting the connector with the upper and lower post sections.

5. A bed construction, comprising:

a pair of side rails;

support structure for spacing the side rails above a supporting surface;

a plurality of cross-members extending between the side rails; and a bottom wall disposed between the side rails and supported by the cross-members, the bottom wall being defined by two or more panels, each panel having a top, a bottom and transverse edges, wherein facing edges of adjacent panels are located closely adjacent each other and are free of attachment to the cross-members to define joints between panels, and wherein the cross-members are arranged so as to engage the bottoms of adjacent panels adjacent each joint such that each joint is located over one of the cross-members.

6. The bed construction of claim 5, wherein the support structure comprises a series of posts, each post having a substantially vertical longitudinal recess defined by two or more recess walls, a series of vertically spaced slots formed in one of the recess walls, and wherein the pair of side rails each include tab structure at opposite ends thereof removably engageable with the spaced vertical slots for removably mounting the rails to the posts.

7. The bed construction of claim 6, wherein each side rail comprises an assembly including a first rail member defining spaced ends on which the tabs are formed, and a second rail member mounted to the first rail member and defining spaced ends engageable with the posts.

8. The bed construction of claim 7, wherein the cross-members are removably engageable with the first rail members.

9. The bed construction of claim 8, wherein each of the cross-members defines spaced ends, each end having a downwardly extending locking tab, and wherein the first rail members include upwardly facing recesses, each of which is adapted to receive one of the cross-member locking tabs.

10. The bed construction of claim 5, wherein each cross-member is substantially U-shaped in cross-section, including a pair of spaced upwardly extending legs, and wherein each joint is disposed between the upwardly-facing legs of one of the cross-members.

11. The bed construction of claim 10, wherein at least one of the cross-members is disposed toward one end of the rails and extends therebetween to define one end of a support assembly defined by the cross-members and the bottom wall, and wherein one of the legs of the U-shaped cross-member includes an upper extension and a transverse lip, and wherein an end one of the panels has its edge disposed below the lip and in close proximity to the extension.

12. A bed construction, comprising:
   four corner posts, each post having a series of spaced vertical slots;
   a pair of rails, each rail defining a pair of ends, wherein each rail end includes tabs removably engageable within the slots for removably mounting the rails to the corner posts, wherein each rail defines an inwardly facing substantially vertical inner surface;
   a bottom wall interposed between the rails for supporting a mattress thereabove; and
   a plurality of cross-members extending between the rails and engageable with the bottom wall for supporting the bottom wall thereabove, wherein the cross-members are connected to the rails via connection structure including a downwardly extending locking tab formed at each end of each cross-member and an upwardly facing recess associated with each rail for receiving the locking tab to removably secure each cross-member to the rail wherein the upwardly facing recess is defined by the inner surface of each rail in combination with a strip member interconnected with the rail inner surface and having at least a portion spaced inwardly from the rail inner surface.

13. The bed construction of claim 12, wherein each rail comprises an assembly including a first rail member defining spaced ends on which the tabs are formed, and a second rail member mounted to the first rail member and defining spaced ends, each of which engages one of the corner posts.

14. The bed construction of claim 13, wherein the first rail member comprises an inner rail member defining the rail inner surface and to which the strip member is connected.

15. The bed construction of claim 12, wherein the strip of material and the first rail member are each formed of metal, and wherein the strip is formed integrally with the first rail member.

16. The bed construction of claim 12, wherein the bottom wall is defined by two or more panels, each panel having transverse edges, wherein facing edges of adjacent panels define a joint between the panels and wherein each joint is located over one of the cross-members.

* * * * *